United States Patent [19]
Oakley, Jr. et al.

[11] 3,880,188
[45] Apr. 29, 1975

[54] HOSE RETRACTOR FOR AN APPLIANCE

[75] Inventors: Roy C. Oakley, Jr., Coloma, Mich.; James I. Czech, Lexington, Mass.

[73] Assignee: Whirlpool Corporation, Benton Harbor, Mich.

[22] Filed: Nov. 15, 1973

[21] Appl. No.: 415,959

[52] U.S. Cl. ........... 137/577; 134/186; 137/355.17; 137/355.28
[51] Int. Cl. .......................................... B65h 75/36
[58] Field of Search ............... 137/577, 579, 565, 137/355.16–355.28, 186, 562

[56] References Cited
UNITED STATES PATENTS

| | | | |
|---|---|---|---|
| 1,940,701 | 12/1933 | Shope | 137/355.23 |
| 3,456,680 | 7/1969 | Martiniak | 137/355.17 |
| 3,461,906 | 8/1969 | Eckerle | 137/355.17 |
| 3,710,819 | 1/1973 | Williamson | 137/355.17 |

*Primary Examiner*—Henry T. Klinksiek
*Attorney, Agent, or Firm*—Hill, Gross, Simpson, Van Santen, Steadman, Chiara & Simpson

[57] ABSTRACT

A hose retractor for an appliance having one or more hoses extending from an opening in the cabinet of the appliance and normally stored by being draped inside of the cabinet characterized by a hose retracting device that facilitates retracting and storing of the hoses in the cabinet so as to prevent the draped hoses from either snagging or contacting parts and components of the appliance. The retracting device includes a rod having a hose retainer pivotally mounted on one end and being pivotally mounted at the other end on one side wall of the cabinet by means of a bracket adjacent said one side wall so that the rod and retainer move in a plane substantially parallel to the cabinet side wall to guide the hoses for movement in the parallel plane and closely adjacent to the side wall. Preferably, the connection of the end of the rod to the bracket is accomplished by utilizing an offset portion of the rod to engage the bracket and bias the retainer in sliding engagement with the side wall.

21 Claims, 5 Drawing Figures

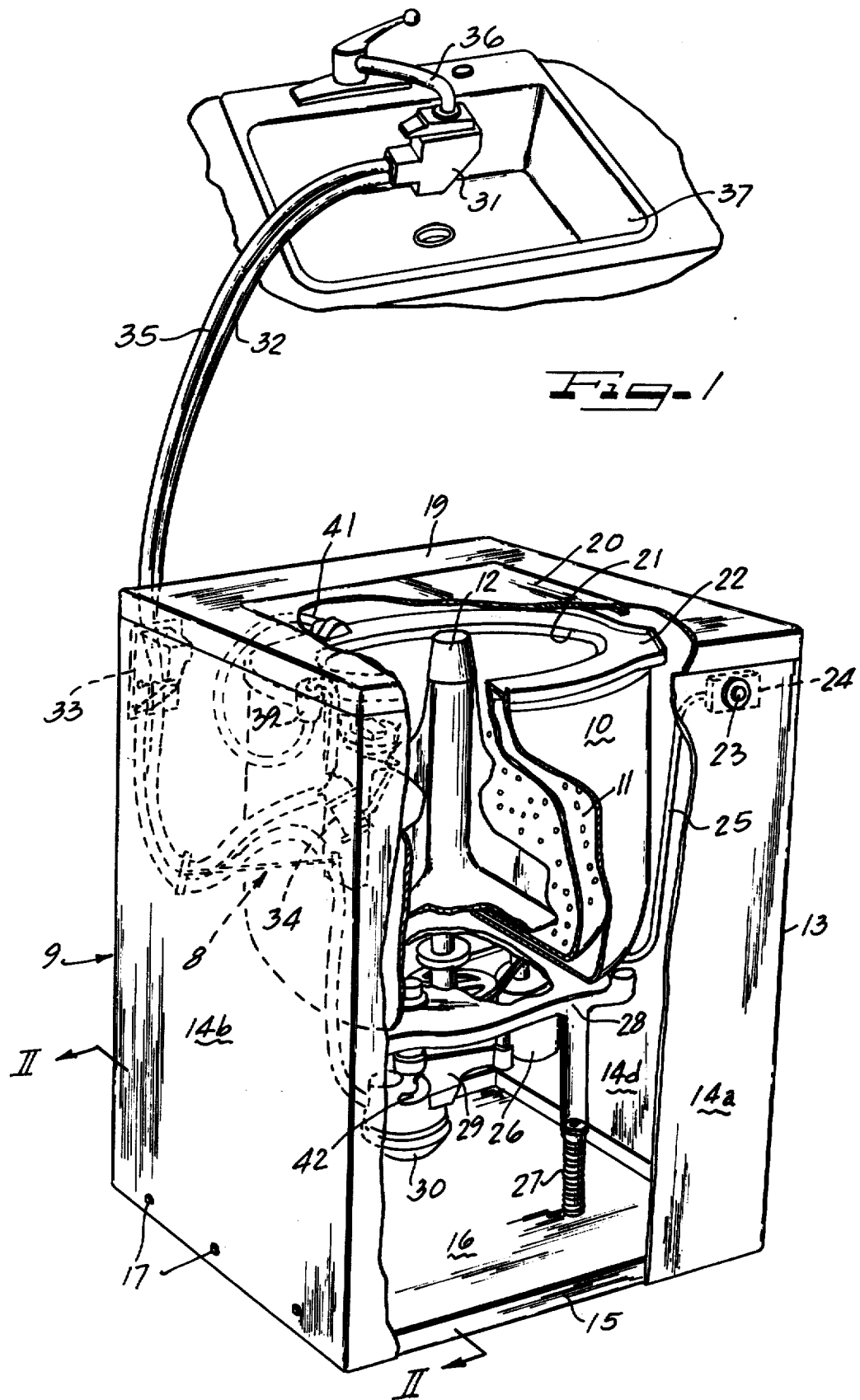

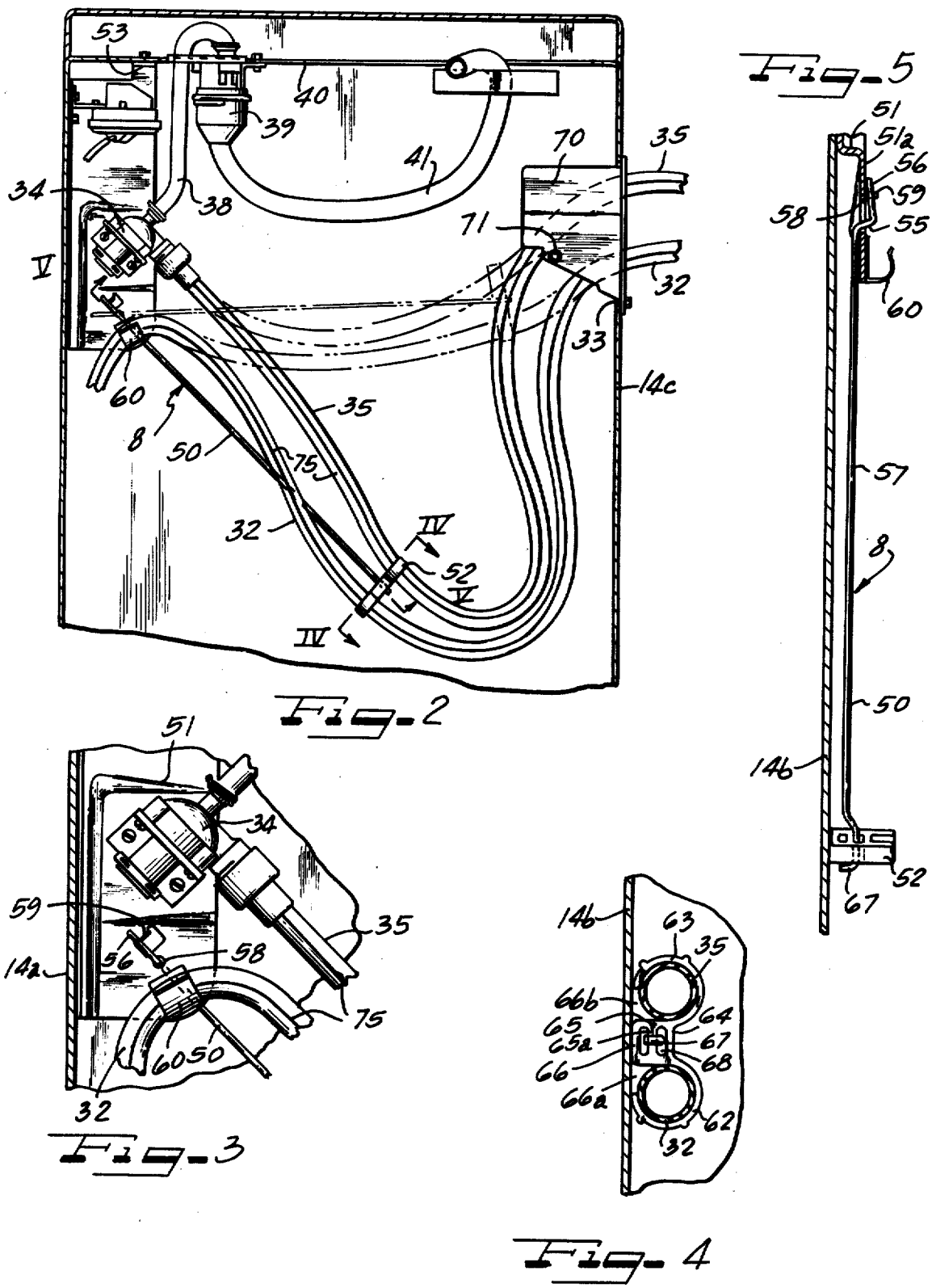

HOSE RETRACTOR FOR AN APPLIANCE

BACKGROUND OF THE INVENTION

1. Field of the Invention

The present invention is directed to a hose retractor particularly adapted for use in an appliance.

2. Prior Art

Portable home appliances such as portable dishwashers and portable automatic washing machines are provided with retractable hoses for connecting the appliance to a source of water such as a faucet of a sink and to provide a discharge line for discharging the water used in washing and rinsing. Normally, the water inlet hose and the drain hose are connected to a single connector which is detachably connected to the faucet of the sink and the hoses have a sufficient length to enable connecting the appliance to the faucet. When not in use, the hoses must be stored and are preferably retracted into the appliance through an opening in the outer cabinet of the appliance to drape or hang in a loose loop between the outer cabinet and the tub or washing chamber. In such an arrangement hoses are often extended from or retracted into the cabinet only with at least some difficulty, and problems have occurred with the hose becoming snagged on various internal parts of the cabinet and on parts of the machine disposed therein. Also, the hose may be damaged by coming in contact with moving parts during operation of the appliance.

To overcome these problems various suggestions have been proposed. For example, it has been proposed to store the hose in a special compartment contained in the cabinet which compartment is adjacent either a side wall or a top wall. It has also been suggested to provide various guides for guiding the hose into an area where it will not become snagged on moving parts or projections of the internal structure of the cabinet of the appliance. However, these proposals for handling the hoses or placing them in a stored position in the cabinet require either additional space in the cabinet or the provision of structural members such as guides or partitions which structural members will increase the manufacturing cost for the appliance.

In portable appliances particularly portable automatic washers, a portion of the hose which is still retained in the cabinet during operation of the appliance may be free to move. Due to vibrations created by the operation of the appliance, the hose may move into contact with moving parts of the appliance and may produce undesirable noise by hitting or slapping against a portion of the cabinet. This slapping against the cabinet is known in the art as "hose slaps." While the provision of separate compartments or hose guides will isolate the hose from coming into contact with the moving parts, such compartments or guides do not prevent the occurrence of "hose slaps."

SUMMARY OF THE INVENTION

The present invention is directed to an apparatus or device for facilitating extending a flexible conduit, such as a hose, from and retracting the hose back into an appliance cabinet, which hose may be part of a fluid passage means for introducing water to and removing water from a washing chamber of the appliance. The apparatus or device facilitates proper handling and storage of the hose and maintains the hose in a plane parallel to a wall of the cabinet as the hose is being moved between an extended position and a stored or retracted position and prevents "hose slaps" and contact of the hose with moving parts of the appliance. The apparatus accomplishes this by providing a hose retainer which engages the hose and which is connected to one end of a rod which is mounted for pivoting movement in a plane extending parallel to a wall of the cabinet so that during extension and retraction of the hose, the hose moves in a plane which is parallel to the cabinet wall. Preferably, the end of the rod which is pivotally mounted on the cabinet is provided with means to urge the retainer into sliding engagement with the one wall to ensure that on extension or retraction the hose freely moves in a plane positively spaced from projections and moving parts of the appliance.

BRIEF DESCRIPTION OF THE DRAWINGS

FIG. 1 illustrates a portable automatic washing machine with portions broken away for purposes of illustration, which washing machine is an example of a portable appliance for which the hose retractor of the present invention is particularly adapted;

FIG. 2 is a partial cross section taken along line II—II of FIG. 1;

FIG. 3 is an enlarged view of mounting brackets utilized in the present invention;

FIG. 4 is a cross section taken along line IV—IV of FIG. 2; and

FIG. 5 is a partial cross section taken along line V—V of FIG. 2 with the hose retainer pivoted relative to the rod.

DESCRIPTION OF THE PREFERRED EMBODIMENTS

The principles of the present invention are particularly useful for providing a hose retracting apparatus or device generally indicated at 8 (FIG. 2) for a portable appliance having a washing chamber. While the hose retracting device or apparatus of the present invention may be used on various appliances having a washing chamber, it is particularly useful in a portable automatic washing machine generally indicated at 9 and diagrammatically shown in FIG. 1.

The automatic washing machine 9 has a tub 10 which receives a perforate clothes container or spin basket 11. An agitator 12 is centrally disposed in the spin basket 11 and mounted for oscillatable movement with respect thereto and for spinning movement with the basket during the extraction of water from the clothes in the basket. The tub 10, the spin basket 11, the agitator 12 and the drive mechanism therefor are enclosed in a cabinet 13.

The cabinet 13 is shown as being generally rectangular in form having a front wall 14a, a pair of side walls 14b, and 14d, and a back wall 14c (FIG. 2) which walls are detachably mounted on an upright flange 15 of a base 16 as by screws 17. The screws 17 may be self-tapping screws of the conventional form and extend through walls 14b, 14c and 14d and flange 15 to detachably secure the cabinet 13 to the base 16. The cabinet 13 also includes a top 19 having a hinged lid 20 openable to afford access to the clothes-receiving opening 21 in a tub ring 22 extending about the tub and over a corresponding opening in a spin basket 11. The cabinet 13 has a timing dial 23 connected to a timer 24 and mounted on the front wall 14a of the top of the cabinet beneath the top 19. Suitable wiring 25 connects the timer 24 to a motor 26 and other electrically operated devices of the machine. The timer dial 23 and timer 24 may be in any desired location and are shown in this present location for illustrative purposes only.

Supported above the cabinet base 16 on spring and vibration dampener assemblies 27 is a base plate 28 forming a support for the tub 10, basket 11 and agitator 12 in a conventional manner. The base plate 28 may be suitably supported on any vibrational dampening assembly which will provide support for the base plate 28 from the cabinet base 16 and which will absorb vibrations caused by spinning of the spin basket 11. The base plate 28 also forms a support for the motor 26 and a drive control mechanism or transmission generally indicated by reference 29 which may also include a clutch and control mechanism, as well as a drive mechanism for oscillatably driving the agitator 12 or spinning the spin basket 11 while releasing the agitator to spin freely with the spin basket.

A pump 30 for removing wash or rinse water from the tub 10 at the termination of a washing or rinsing operation is also supported below the base plate 28 and has an outlet port (not shown) connected to an adapter or coupler 31 by a flexible conduit or drain hose 32 which extends through an opening 33 in the back wall 14c of the cabinet 13. An inlet port (not shown) of the pump 30 communicates with the washing chamber by means of a conduit 42. It should be understood that the motor 26, drive control mechanism 29 and pump 30 can be mounted in any convenient manner between the cabinet base 16 and the base plate 28 and need not necessarily be closely adjacent the base plate 28 as shown.

The cabinet 13 also includes means for mounting a suitable water inlet control device or water inlet valve 34 of a conventional construction which valve supplies the tub 10 with water received by a flexible conduit or water inlet hose 35 which extends through the opening 33 to the adapter 31 which in turn is illustrated as connected to a source of water such as the faucet 36 of a sink 37. The adapter 31 is, of course, provided with a drain outlet connecting to drain hose 32. The water inlet valve 34 (FIG. 2) is connected through a hose 38 that extends to a conventional anti-siphon device 39 which is mounted on a flange 40 on the side wall 14b and discharges into an outlet hose 41 which connects into the tub ring 22 to discharge into the tub 10 (FIG. 1).

As best illustrated in FIG. 2, the retracting device or apparatus indicated at 8 includes a rod 50; mounting means for pivotally mounting one end of the rod adjacent to side wall 14b which means, as illustrated, is a bracket 51; and a hose retainer 52 pivotally connected to the other end of the rod 50. The bracket 51 is mounted to the front wall 14a by screws and has an upper flange 53 which is secured to either the flange 40 of the side wall 14b or to a gusset attached thereto by suitable means such as threaded fasteners. As illustrated, the bracket 51, in addition to providing a pivotal mounting means for the rod 50, provides a mounting for the water inlet valve 34.

To pivotally mount the rod 50 on the bracket 51 for movement in a plane parallel to the wall 14b, one end of the rod is provided with a pair of bends to produce an offset portion comprising a short leg 55 and a second leg or portion 56 (FIG. 5). As best illustrated in FIG. 5, the portion 56 extends at a slight angle (approximately 10°) with respect to the remaining portion 57 of the rod 50. The bracket 51 has an opening or aperture 58 through which the short leg 55 extends so that the second leg 56 engages an opposite side 51a of the basket 51 to provide the pivotal connection between the rod 50 and bracket 51. The bracket 51 is, also, provided with stop means illustrated as a tab or projection 59 bent from the bracket, which tab contacts the leg 56 to limit the arc of pivoting movement of the rod 50 in the clockwise direction as illustrated in FIG. 2. Adjacent to the aperture 58 the bracket 51 supports a clip or clamp 60 which grips the drain hose 32 and holds it in an elevated relationship to the pump 30 and serves as a support point in maintaining the planar position of the hose.

As best illustrated in FIG. 4, the hose retainer 52 is provided with engagement means for slidably engaging each of the hoses 32 and 35, which engagement means are illustrated as resilient curved fingers 62 and 63 which extend from one side 64 of a body portion 65 and terminate adjacent an opposite surface 66 on the body portion to form gaps therewith indicated at 66a and 66b. The retainer 52 is preferably made of a resilient material such as plastic and each of the fingers 62 and 63 can be spread apart to receive the respective hoses 32 and 35. Each of the fingers 62 and 63 engage their respective hose with the engagement means being in a plane (along line IV—IV of FIG. 2) which extends substantially perpendicular to the plane of surface 66 which is in sliding engagement with the inner surface of a flat portion of wall 14b.

To pivotally mount the retainer 52 on the end of the rod 50, the second end of the rod 50 is provided with a hook portion 67 which extends through an elongated slot 68 in the body portion 65 of retainer 52 and hooks around rib member 65a. Thus, the retainer 52 can pivot on the hook portion 67 as the rod 50 moves from its extreme retracted position illustrated in FIG. 2 to an extended position shown in broken lines during extension of the hoses 32 and 35. As mentioned hereinabove, the leg portion 56 engages a surface 51a of the bracket 51 and thus causes a bias of the rod 50 toward the wall 14b to maintain the flat surface 66 in sliding engagement therewith.

As illustrated, the opening 33 receives a housing 70 having an opening through which the hoses 32 and 35 pass. The housing 70 provides a storage recess in the cabinet 13 for the adapter or coupling 31. To prevent twisting or overlapping of the hoses 32 and 35 and binding of the two hoses as a result, a divider or separator 71, which can be a pin extending horizontally across the opening of the housing or a bar molded as an integral part of housing 70, is provided. The divider maintains the water inlet hose 35 above the drain hose 32.

Since it is important to prevent any twisting of the hoses 32 and 35 during installation thereof, one or both of the hoses may be provided with indicator means such as a longitudinal stripe 75 so that the assembler can easily determine if the hoses have been attached to the appliances 10 without any twisting. For example, if the hoses are properly oriented, i.e. installed, without any residual twist which would cause a tendency in the hoses to curl or twist, virtually all portions of the stripes 75 will be visible and substantially parallel to the edges of the hoses as shown in FIG. 2.

The hose retainer 52, the opening in housing 70 and the clamp 60 and valve 34 provide a three point suspension for the hoses 32 and 35 when they are in the retracted position. Due to the natural rigidity of the hoses, the three point suspension causes the hoses to hang or drape in a plane substantially parallel to the side wall 14b well away from the moving parts of the appliance and from any parts on which it is possible for the hoses to become snagged. As mentioned above, a tab 59 is provided to prevent or limit the extent or amount of movement of the retracting device 8 in the retracting direction. Thus, when the leg 56 engages the tab 59, the retainer 52 is positioned in its extreme retracted position which prevents the hoses 32 and 35 from draping into a lower position which may enable the hoses to snag or engage moving parts of the appliance.

As the hoses are extended for connection of the coupling 31 to the faucet 36, the hoses will assume an extended position which is illustrated in broken lines in FIG. 2. If during operation the hose pair is in a partially extended position with a slight draping, the device 8 provides sufficient restraint to prevent "hose slaps" from occurring due to vibrations imparted by the appliance. Thus, the device 8 besides guiding the hose during extension and retraction and preventing the hose from becoming entangled or snagged on the internal parts of the appliance also prevents undesirable noise due to "hose slaps."

While the retracting device has been described for coacting with a pair of hoses which provide a drain passageway and an inlet passageway for the appliance 9, the retainer 52 can be modified to engage a single hose which may contain one or more fluid passageways.

Although various minor modifications might be suggested by those versed in the art, it should be understood that we wish to employ within the scope of the patent warranted hereon all such modifications as reasonably and properly come within the scope of our contribution to the art.

The embodiments of the invention in which an exclusive property or privilege is claimed are defined as follows:

1. An apparatus for retracting a hose within an appliance cabinet having a flat wall portion on at least one side, said apparatus comprising a rod, mounting means for pivotally mounting one end of the rod adjacent said one side of the cabinet for pivoting movement in a plane substantially parallel to said wall portion, a hose retainer having engagement means for slidably engaging the hose, said hose retainer being pivotally attached to the other end of said rod with the engagement means being in a plane substantially perpendicular to the plane of said one side of the cabinet.

2. An apparatus as claimed in claim 1, wherein the mounting means for pivotally mounting said one end of said rod comprises a bracket mounted adjacent to said one side of said appliance, said bracket including stop means for limiting the amount of pivoting movement in one direction.

3. An apparatus as claimed in claim 2, wherein said stop means comprises a projection disposed on said bracket.

4. An apparatus as claimed in claim 1, wherein the hose retainer has a flat surface for slidably engaging said wall portion.

5. An aparatus as claimed in claim 4, wherein said one end of said rod has an offset portion and wherein said mounting means for pivotally mounting said rod includes a bracket mounted in the cabinet adjacent said one side, said bracket having an aperture receiving and cooperating with the offset portion of said one end of the rod to form the pivotal mounting thereof.

6. An apparatus as claimed in claim 5, wherein the end of the offset portion of said rod extends at a slight angle to the rod and engages the bracket to bias the retainer toward said wall portion as the rod pivots about said one end.

7. An apparatus as claimed in claim 6, wherein said hose has indicator means extending along the length thereof for indicating the presence of a twist in said hose.

8. In an appliance having a cabinet containing a washing chamber and at least one flexible conduit in fluid communication with said washing chamber and extending through an opening in a first wall of the cabinet, said flexible conduit being movable from a retracted position draped in the cabinet to an extended position with a portion of the flexible conduit extending from the cabinet, the cabinet having a second wall with a flat portion adjacent the first wall, the improvement comprising retracting means for retracting the flexible conduit including a rod having a first and second end, mounting means for pivotally mounting the first end of the rod adjacent said flat portion of said second wall for pivoting movement of the rod in a plane extending parallel to said flat portion of said second wall, and a retainer having engagement means for slidably engaging the outer surface of the flexible conduit, said retainer being pivotally mounted on said second end of the rod by a pivotal connection with the engagement means being in a plane extending substantially perpendicular to the flat portion of said second wall so that as the flexible conduit is retracted, said retracting means guides said flexible conduit to move in a plane parallel to the flat portion of said second wall.

9. In an appliance as claimed in claim 8, wherein the first end of the rod is provided with an offset portion comprising a pair of bends and wherein the means for pivotally mounting the first end of the rod includes a bracket mounted adjacent to said one side, said bracket having an aperture for receiving the offset portion of said first end of said rod to cooperate therewith to form a pivotal connection therebetween.

10. In an appliance as claimed in claim 9, wherein the retainer has a flat surface adjacent to the engagement means for slidably engaging the flat portion of the second wall and wherein a portion of the offset portion of the rod is at a slight angle to the remaining portion of the rod to engage the bracket and bias the flat surface of the retainer against said flat portion of said second wall.

11. In an appliance as claimed in claim 10, wherein the bracket includes a projection for engagement by the rod to limit pivoting movement of the rod in one direction.

12. In a portable appliance having a cabinet containing a washing chamber and means for introducing fluid to and removal of fluid from the chamber which means includes a pair of fluid passageways from the chamber provided in at least one hose extending through an opening in a first wall of the cabinet and terminating in a coupling adapted for connection to a source of water and for providing a fluid discharge, said hose being movable from a retracted position draped in the cabinet to an extended position with a portion of the hose extending from the cabinet, the cabinet having a second wall with a flat portion adjacent the first wall, the improvement comprising retracting means for retracting the hose including a rod having a first and second end, mounting means for pivotally mounting the first end of the rod adjacent said flat portion of said second wall for pivoting movement of the rod in a plane extending parallel to said flat portion of said second wall, and a hose retainer having engagement means for slidably engaging the outer surface of the hose, said retainer being pivotally mounted on said second end of the rod by a pivotal connection with the engagement means being in a plane extending substantially perpendicular to the flat portion of said second wall so that as the hose is retracted, said retracting means guides the hose to move in a plane parallel to the flat portion of said second wall.

13. In a portable appliance as claimed in claim 12, wherein the first end of the rod is provided with an offset portion comprising a pair of bends and wherein the means for pivotally mounting the first end of the rod includes a bracket mounted adjacent to said one side, said bracket having an aperture for receiving the offset portion of said first end of said rod to cooperate therewith to form a pivotal connection therebetween.

14. In a portable appliance as claimed in claim 13, wherein the hose retainer has a flat surface adjacent to the engagement means for slidably engaging the flat portion of the second wall and wherein a portion of the offset portion is at a slight angle to the remaining portion of the rod to engage the bracket and bias the flat surface of the retainer against said flat portion of said second wall.

15. In a portable appliance according to claim 14, wherein the bracket includes a projection for engagement by the rod to limit the arc of pivoting movement of the rod in one direction.

16. In a portable appliance as claimed in claim 12, wherein the pair of fluid passageways are provided in a drain hose and a water inlet hose respectively, and wherein the engaging means of the hose retainer engages each of said hoses.

17. In a portable appliance as claimed in claim 16, wherein the opening in the first wall of the cabinet includes means for separating the two hoses, and wherein the means for pivotally mounting includes a bracket supporting a water inlet valve receiving the water inlet hose and providing a hose support for the drain hose.

18. In a portable appliance as claimed in claim 16, wherein the hose retainer has a body portion having an elongated slot for loosely receiving the second end of said rod to form the pivotal connection, said hose retainer including a pair of curved fingers extending from the body portion for slidably gripping each of the respective hoses disposed on opposite sides of said body portion.

19. In a portable appliance as claimed in claim 18, wherein the free end of each of the curved fingers terminates adjacent to the flat surface of the body portion.

20. An appliance utilizing a washing fluid and having a cabinet containing a washing chamber, said cabinet having a first wall with a flat inside portion and a second wall with an opening adjacent said first wall;

a first and a second flexible conduit in fluid communication with the washing chamber and extending through the opening in the second wall of the cabinet; and retracting means for retracting and retaining the two flexible conduits within the cabinet, said retracting means comprising:

a mounting bracket carried by the cabinet adjacent the flat inside portion of the second wall and having an aperture and a projection adjacent said aperture, a retainer including a body portion having an elongated slot, a pair of curved fingers extending from said body portion to slidably grip the first and the second flexible conduits respectively on opposite sides of said body portion, and a flat surface portion adjacent said curved fingers and said elongated slot in said body portion for slidably engaging the flat inside portion of the second wall; and a rod having a first and a second end, said first end of said rod being pivotally mounted on the mounting bracket adjacent the flat inside portion of the second cabinet wall for pivoting movement in a plane extending parallel to said flat inside portion of said second wall, said first end of said rod being provided with an offset portion received by the aperture of the mounting bracket with said offset portion disposed at a slight angle to the remaining portion of said rod to engage said bracket and bias the flat surface of the retainer against the flat portion of the second wall, said offset portion of said first end of said rod engaging the projection to limit the arc of pivotal movement of the rod in one direction, said second end of said rod having a hook portion for engaging the elongated slot in the body portion of the retainer to pivotally carry said retainer with the plane of the curved fingers substantially perpendicular to the flat inside portion of said second wall;

whereby the flexible conduits are retained in a plane substantially parallel to the flat inside portion of the second wall and are movable between a retracted position draped in the cabinet and an extended position with a portion of the flexible conduits extending from the cabinet.

21. A portable automatic washer having a cabinet containing a washing chamber, fluid passage means for introducing fluid to and removing fluid from said washing chamber, said cabinet having a first wall with a flat inside portion and a second wall with an opening adjacent said first wall, and said fluid passage means including a coupling adapted for connection to a source of water and for providing a fluid discharge, a drain hose and a water inlet hose each having a first end extending through said opening in said second wall and received by said coupling and a second end, a water inlet control device in fluid communication with the washing chamber and receiving the second end of the water inlet hose, and pump means for causing a fluid discharge from said washing chamber and including an inlet port in fluid communication with the washing chamber and an outlet port receiving the second end of the drain hose; and retracting means comprising:

a housing carried in the opening in the first wall of the cabinet for containing the coupling when the hoses are in a retracted position, said housing including a pin horizontally disposed between said hoses for separation thereof;

a mounting bracket carried by the cabinet adjacent the flat inside portion of the second wall and having an aperture and a projection adjacent said aperture, said mounting bracket supporting the water inlet control device and providing a hose support for the drain hose;

a hose retainer including a body portion having an elongated slot, a pair of curved fingers extending from said body portion to slidably grip the drain hose and the water inlet hose respectively on opposite sides of said body portion, and a flat surface portion adjacent said curved fingers and said elongated slot in said body portion for slidably engaging the flat inside portion of the second wall; and a rod having a first and a second end, said first end of said rod being pivotally mounted on the mounting bracket adjacent the flat inside portion of the second cabinet wall for pivoting movement in a plane extending parallel to said flat inside portion of said second wall, said first end of said rod being provided with an offset portion received by the aperture of the mounting bracket with said offset portion disposed at a slight angle to the remaining portion of said rod to engage said bracket and bias the flat surface of the hose retainer against the flat portion of the second wall, said offset portion of said first end of said rod engaging the projection to limit the arc of pivotal movement of the rod in one direction, said second end of said rod having a hook portion for engaging the elongated slot in the body portion of the hose retainer to pivotally carry said hose retainer with the plane of the curved fingers substantially perpendicular to the flat inside portion of said second wall;

whereby the hoses are retained in a plane substantially parallel to the flat inside portion of the second wall and are movable between a retracted position draped in the cabinet and an extended position with a portion of the hoses extending from the cabinet.

* * * * *